June 11, 1968 R. R. TEN EYCK 3,388,257

SYSTEM FOR INTRODUCING TREMOLO AND VIBRATO INTO AUDIO FREQUENCY SIGNALS

Filed Jan. 14, 1965

INVENTOR.
ROBERT R. TEN EYCK
BY
Brumbaugh, Free, Graves & Donohue
his ATTORNEYS

United States Patent Office 3,388,257

Patented June 11, 1968

3,388,257

SYSTEM FOR INTRODUCING TREMOLO AND VIBRATO INTO AUDIO FREQUENCY SIGNALS

Robert R. Ten Eyck, Morgan, N.J., assignor to The Ampeg Company, Inc., Linden,, N.J., a corporation of New York Filed Jan. 14, 1965, Ser. No. 425,579
7 Claims. (Cl. 250—217)

ABSTRACT OF THE DISCLOSURE

Photoconductive cells in an audio frequency signal circuit are activated by a radiant energy source that is in turn selectively energized from a low frequency generator in order to provide a modulation of the audio frequency in the form of tremolo and/or vibrato musical effects.

This invention relates to apparatus for phase modulating and amplitude modulating an electrical signal and, more particularly, to improved apparatus for introducing tremolo and vibrato into audio frequency program material and for selectively altering the tonal quality of this material.

It is well known that tremolo and vibrato provide a more pleasing musical sound, and both musicians and singers introduce these effects into their music. Although the terms tremolo and vibrato are often used interchangeably, tremolo properly refers to a very low rate modulation of the amplitude or intensity of the sound, while vibrato is caused by a very low rate modulation of the pitch or frequency of the sound. The modulation rate or frequency for both tremolo or vibrato is in the range of approximately 3 to 15 cycles per second.

In the past, amplifiers have been designed incorporating appropriate circuitry for introducing tremolo into program material being amplified thereby. For example, audio amplifiers have been proposed in which the output of an oscillator operating at a tremolo frequency is electrically connected to a midpoint between the control grids of the push-pull output stage so as to amplitude modulate the signals fed to these grids. It has also been proposed to produce musical notes by revolving a perforated disc between a light source and a photovoltaic cell, the output of which is amplified. Vibrato is introduced by varying the rotation speed of the disc at a vibrato rate.

There are numerous disadvantages with such prior art devices for producing tremolo and vibrato. Where a tremolo oscillator directly connected to the amplifier stage is used, it is loaded in accordance with the frequency and amplitude of the tremolo signal being supplied to the amplifier. Also, such coupling between the amplifier and the oscillator results in distortion of the tremolo signal, such distortion depending upon the nature of the program material presented to the amplifier. Vibrato systems including a variable speed tone disc are not only expensive, but are unreliable and costly to maintain due to the mechanical components. Furthermore, tremolo and vibrato in one unit would require two entirely different systems.

Accordingly, it is an object of the present invention to overcome the above-mentioned difficulties of conventional tremolo and vibrato systems.

Another object of the invention is to provide a novel apparatus for phase modulating and amplitude modulating an electrical signal fed to the apparatus wherein the means for generating the modulation is electrically and mechanically independent of the portion of the apparatus which transmits the electrical signal.

A further object of the invention is to provide an improved apparatus for introducing tremolo and vibrato into an audio frequency signal including a network fed by the signal and a source of tremolo and vibrato modulation coupled to the network without electrical or mechanical connection.

Still another object of the invention is to provide an improved apparatus for introducing tremolo and vibrato into an audio frequency signal which includes wave shaping circuitry for selectively altering the waveform of the tremolo and vibrato modulation so as to change the tonal quality of the audio frequency signal.

These and other objects and advantages of the invention are attained by irradiating with electromagnetic energy of varying intensity photoconductive means in a network fed by the electrical signal which is to be phase and/or amplitude modulated, so that the signal is modulated in accordance with the intensity of the electromagnetic energy. In one embodiment the photoconductive means forms an element of a voltage dividing network which amplitude modulates a signal fed thereto. In another embodiment the photoconductive means is an element of an adjustable phase shifting network which phase modulates an input signal. Another embodiment incorporates these amplitude and phase modulating networks so that an input signal may se selectively amplitude modulated, phase modulated or simultaneously amplitude and phase modulated. Still another embodiment of the invention includes circuitry associated with the source of electromagnetic energy for selectively shaping the waveform of the modulating signal applied to the energy source in order to alter the tonal quality of the electrical signal being modulated.

All of the above is more fully explained in the detailed description of several preferred embodiments of the invention which follow, this description being illustrated by the accompanying drawings wherein.

Figure 1:
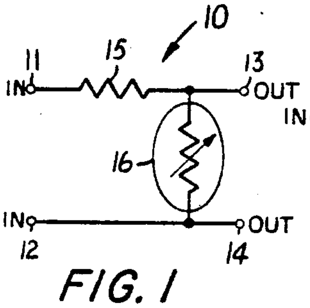
FIG. 1 is a schematic circuit diagram of a network of the apparatus according to the invention for amplitude modulating an electrical signal applied to the input of the network.

In the representative network for amplitude modulating an electrical signal applied thereto shown by way of example in FIG. 1, a four terminal network 10 includes a pair of input terminals 11 and 12 and a pair of output terminals 13 and 14, the terminals 12 and 14 being connected in common. A resistor 15 is connected between the terminals 11 and 13, and a photoresistor or photoconductive cell 16 is connected between the terminals 13 and 14. The photoresistor may be of any suitable type and may be of cadmium sulfide, for example. As is well known to the art, the conductivity of a photoconductive cell is dependent upon the intensity of electromagnetic energy incident thereon. The network 10 may be used as a variable voltage dividing network, an electrical signal at the input terminals producing a signal at the output terminals of amplitude dependent upon the ratio of the resistance values of the resistor 15 and the photoconductive cell 16. Thus the variable voltage divider is adjusted or controlled in accordance with the intensity of electromagnetic energy incident upon the photoresistor 16. If the photoresistor is irradiated with electromagnetic energy of varying intensity, for example if the radiation source (not shown) is modulated by a modulating signal, then the input signal will be amplitude modulated at the frequency of the modulating signal. It is apparent that the energy source may be located at a distance from the photoconductive cell, if desired, to permit remote amplitude modulation of the input signal or remote control or operation of any circuitry associated with the network 10. It is only necessary to provide a suitable optical or antenna system to direct the radiation from the energy source to the photoresistor. If the modulating system is within the tremolo frequency range of approximately 3 to 15 cycles per second, the network 10 may be conveniently used to introduce tremolo into an audio frequency signal, as will be shown presently.

Figure 2:
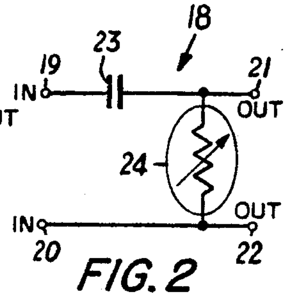
FIG. 2 is a circuit diagram of a network for phase modulating an electrical signal applied thereto.

FIG. 2 shows a network 18 for phase modulating an electrical signal applied at the input terminals 19 and 20 thereof, the phase modulated signal appearing at the output terminals 21 and 22. A capacitor 23 is connected between the terminals 19 and 21, and a photoconductive cell 24 is connected between the terminal 21 and the common terminals 20 and 22. As is well known, such a resistance-capacitance network shifts the phase of a signal fed thereto in accordance with the frequency of the signal and the values of the resistance and capacitance. Inasmuch as the resistance of the photoconductive cell depends upon the intensity of incident electromagnetic energy, modulation of the energy source (not shown) effects phase modulation of the input signal, and if the modulating signal is within the vibrato frequency range the network 18 may be used to introduce vibrator into the input signal.

Figure 3:
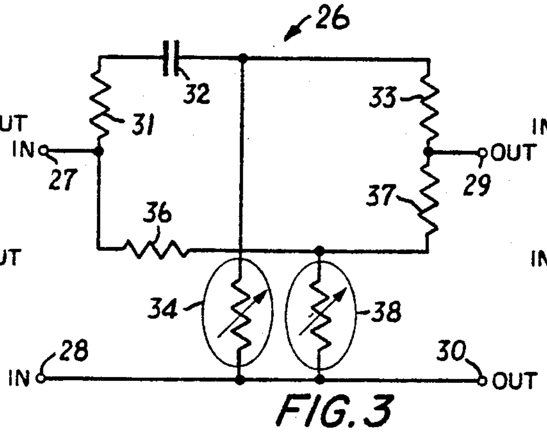
FIG. 3 is a circuit diagram of a network for amplitude modulating and phase modulating an electrical signal applied thereto.

A network 26 is illustrated in FIG. 3 for amplitude modulating and phase modulating an electrical signal applied to the input terminals 27 and 28 thereof, the modulated output signal being produced at the terminals 29 and 30. The network 26 includes two T networks connected in parallel relationship between the input and output terminals. One T network has a first series arm connected to the terminal 27 including a resistor 31 and a capacitor 32 in series, a second series arm with a resistor 33 connected to the terminal 29 and a shunt arm therebetween with a photoconductive cell 34 connected to the common terminals 28 and 30. The other T network has a first series arm with a resistor 36 connected to the terminal 27, a second series arm with a resistor 37 connected to the terminal 29 and a shunt arm therebetween with a photoconductive cell 38 connected to the common terminals 28 and 30. The capacitor 32 and photoresistor 34 comprise a variable phase shifting network, and the resistor 36 and the photoresistor 38 comprise a variable voltage divider network. The resistors 31, 33 and 37 insure that the phase shifting network and the voltage divider network are sufficiently isolated from each other. Either of the photoresistors 34 and 38 may be irradiated by a modulated source of electromagnetic energy in order to phase modulate or amplitude modulate the input signal, respectively. Alternatively, both photoresistors may be simultaneously irradiated by a single energy source. This is especially desirable if the modulating signal is in the tremolo and vibrato frequency range so as to simultaneously introduce tremolo and vibrato into the input signal, as one effect enhances the other.

Figures 4, 5:
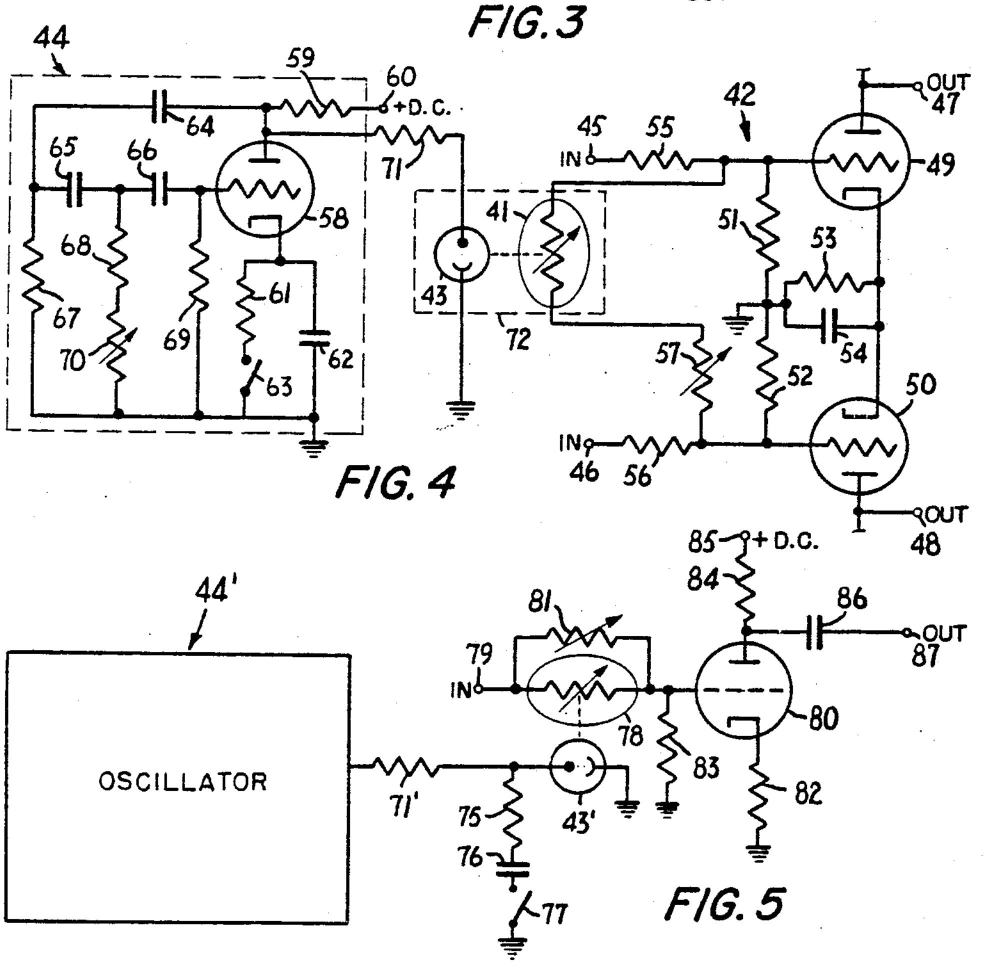
FIG. 4 is a simplified circuit diagram of another embodiment of the invention for amplitude modulating a push-pull stage of an amplifier.
FIG. 5 is a circuit diagram of still another embodiment of the invention for amplitude modulating a single-ended amplifier stage, including circuitry for selectively shaping the waveform of the modulating signal.

In FIG. 4 a photoconductive cell 41 in a push-pull amplifier stage 42 is irradiated by a neon lamp 43 which is modulated by a resistance-capacitance oscillator 44. If the values of the oscillator circuit components are selected so that the oscillator operates in a frequency range of approximately 3 to 15 cycles per second, tremolo will be introduced into an audio frequency signal fed to the input terminals 45 and 46 of the amplifier stage 42, the output of which appears between the terminals 47 and 48 at the plates of the vacuum tubes 49 and 50 respectively. The plate circuit is assumed to be a conventional one for a push-pull amplifier stage and is not shown in detail. Conventional grid leak resistors 51 and 52 connect the control grids of the tubes 49 and 50 respectively to ground, and the cathodes are grounded through a well known self-biasing network including the resistor 53 and the capacitors 54. A pair of resistors 55 and 56 in series with the control grids together with a variable resistor 57, the photoresistor 41 and the grid leak resistors 51 and 52 comprise a variable voltage divider network for the inputs to the vacuum tubes. The variable resistor 57 controls the intensity of the tremolo effect introduced, i.e., the effect that a given range of resistance value of the photoresistor has upon the voltage divider action between the input terminals and the control grids.

The resistance-capacitance oscillator 44 is well known to the art. The plate of the vacuum tube 58 is connected through a plate resistor 59 to a source of DC voltage (not shown) by the terminal 60. The cathode is connected through a self-biasing network including the resistor 61 and the capacitor 62 to ground, the switch 63 controlling the operation of the oscillator. The plate is coupled to the control grid by a three stage phase shifting network including the capacitors 64, 65 and 66, the resistors 67, 68 and 69, and a variable resistor 70. The values of these circuit components determine the total phase shift of the signal coupled to the grid and therefore determine the frequency at which the oscillator operates, the variable resistor 70 adjusting the frequency over the desired range. A resistor 71 connects the oscillator plate with the neon lamp 43. The resistance value of this resistor is selected so that the lamp remains in a "fired" or conductive state when the oscillator plate voltage dips to a minimum. This insures that the lamp is modulated by an undistorted sine wave signal to provide a pure tremolo effect.

The neon lamp 43 is disposed in cooperative relationship with the photoconductive cell 41, so that sufficient radiation reaches the cell to insure its operation over the desired resistance range. In this regard, the lamp and the cell may be shielded from ambient radiation such as extraneous light by a suitable enclosure indicated in phantom at 72.

By coupling the neon lamp with the amplifier 42 solely by means of the electromagnetic radiation emitted by the lamp, both the oscillator and the lamp are electrically and mechanically independent of the modulated amplifier. Therefore, the oscillator 44 has a constant load regardless of any impedance variations in the amplifier due to variations in component values or to frequency changes in the input or oscillator signals, for example. Furthermore, there is minimal coupling of signals from the amplifier to the oscillator which might otherwise distort the signal applied to the neon lamp.

FIG. 5 shows a circuit for amplitude modulating a single-ended amplifier stage which includes a network for selectively shaping the waveform of the oscillator signal applied to the energy source. Like parts in this figure and in FIG. 4 are designated by like primed reference numerals in FIG. 5. The oscillator 44' is of the resistance-capacitance type and requires no further discussion. The output of the oscillator is connected through a resistor 71' to the neon lamp 43' as before. A series connected resistor 75 and capacitor 76 may be inserted in shunt across the neon lamp by a switch 77. Disposed in cooperative relationship with the neon lamp is a photoconductive cell 78, which connects the input terminal 79 of the amplifier stage with the control grid of a vacuum tube 80. A variable resistor 81 connected in shunt across the photo-resistor 78 controls the intensity of the tremolo effect introduced into an input signal applied to the terminal 79. The cathode of the tube 80 is connected to ground through a cathode resistor 82, and the control grid is grounded through a grid leak resistor 83, so that the photoresistor, the variable resistor 81 and the grid leak resistor 83 comprise a variable voltage dividing network between the input terminal and the control grid. The plate of the vacuum tube 80 is connected through a plate resistor 84 to a source of DC voltage (not shown) at the terminal 85 and through a coupling capacitor 86 to an output terminal 87.

Figure 6A:
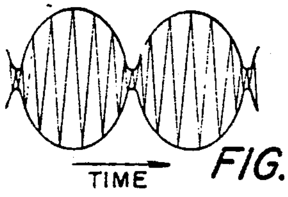
FIG. 6A shows the waveform of a typical output signal produced by the amplifier stage of FIG. 5 when the wave shaping circuitry is inoperative.

If the circuit components of the oscillator 44' are selected so that the oscillator operates in a tremolo frequency range, the apparatus of FIG. 5 operates essentially as that of FIG. 4 so long as the switch 77 is open, i.e., tremolo will be introduced into an audio frequency signal applied to the terminal 79, the intensity of the tremolo being controlled by the variable resistor 81. FIG. 6A shows the waveform of a typical output signal at the terminal 87 when the switch 77 is open, an input signal of constant peak amplitude being applied to the terminal 79.

Figure 6B:
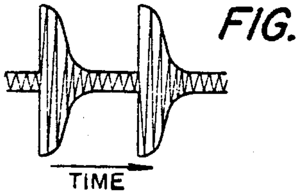
FIG. 6B shows the waveform of a typical output signal produced by the amplifier stage of FIG. 5 when the wave shaping circuitry is operative.

When the switch 77 is closed, however, the neon lamp 43' is extinguished during a substantial portion of a cycle of the sine wave voltage produced by the oscillator 44'. In particular, the portion of a cycle during which the neon lamp is extinguished is dependent upon the time constant of the network including the resistors 71' and 75 and the capacitor 76. As the oscillator output voltage rises, the voltage across the neon lamp increases until the lamp is suddenly energized, and then the intensity of the light emitted by the lamp gradually decays at the voltages across the lamp and at the oscillator output decrease until the lamp is again extinguished. As a result, the resistance of the photoconductive cell 78 suddenly decreases and then gradually increases during each cycle of the oscillator. The envelope of the audio signal applied to the control grid of the amplifier stage has a very steep leading edge and a very gradual trailing edge. FIG. 6B shows the waveform of a typical output signal at the terminal 87 when the switch 77 is closed, an input signal of constant peak amplitude being applied to the terminal 79.

The "after beat" effect thus produced on the audio input signal is similar to "repeat percussion" produced in electronic organs, and a variety of musical effects can be created by an amplifier including the circuitry of FIG. 5. For example, non-percussive attack instruments such as the accordion may be made to sound like a banjo. A plectrum tremolo effect such as used on the mandolin may be given to guitars and other string instruments. Tonal color may be added to the music produced by an instrument. By synchronizing the playing speed of a plucked instrument such as a guitar to trail the "repeat" speed of the tremolo frequency, an echo effect may be realized. Also, a metronome effect can be created by a musical instrument played through such an amplifier.

While the fundamental novel features of the invention have been shown and described, it will be understood that various substitutions, changes and modifications in the form and details of the apparatus illustrated and its manner of operation may be made by those skilled in the art without departing from the spirit and scope of the invention. All such variations and modifications, therefore, are included within the intended scope of the invention as defined by the following claims.

I claim:

1. Apparatus for introducing tremolo to a pair of audio signals fed to an audio amplifier stage having a pair of vacuum tubes arranged in push-pull relationship, the audio signals being fed out of phase to the control grids of the vacuum tubes and the plates of said tubes being connected in opposite phase, comprising:
first resistance means coupled in series with one of the control grids,
second resistance means coupled in series with the other of the control grids,
photoconductive means coupled between the two control grids,
a source of electromagnetic energy disposed in cooperative relationship with the photoconductive means, and
means for modulating the energy source with a modulating signal having a frequency in the range of approximately 3 to 15 cycles per second.

2. Apparatus according to claim 1 including variable resistance means for adjusting the intensity of the tremolo connected in series with the photoconductive means.

3. Apparatus according to claim 1 including wave shaping means for altering the waveform of the modulating signal comprising third resistance means connected between the modulating means and the energy source, and capacitance means connected in shunt across the energy source.

4. Apparatus according to claim 3 including fourth resistance means and switching means connected in series with the capacitance means.

5. Apparatus for modulating an audio frequency signal comprising a voltage attenuating network including photoconductive means, a radiant energy source disposed in cooperative relationship with said photoconductive means, a low frequency generator energizing said radiant energy source and producing an output of substantially sine-wave form, and means in parallel with said radiant energy source providing a selected delay in each cycle of the output frequency before energization of said radiant energy source.

6. Apparatus according to claim 5 wherein said last mentioned means includes an energy storage means connected in parallel with said radiant energy source.

7. Apparatus according to claim 5 wherein said last mentioned means comprises a first resistance connected in series between said low frequency generator and said radiant energy source, capacitive means connected in parallel with said radiant energy source, and switching means connected in series with said capacitive means to selectively control its inclusion in the circuit.

References Cited

UNITED STATES PATENTS

| | | | |
|---|---|---|---|
| 2,140,769 | 12/1938 | Schienemann | 332—17 |
| 2,814,726 | 11/1957 | Anderson | 84—1.25 X |
| 3,040,613 | 6/1962 | Tennes | 84—1.25 |
| 3,119,890 | 1/1964 | Peterson | 84—1.25 |
| 3,250,845 | 5/1966 | Peterson | 332—3 X |

FOREIGN PATENTS

| | | |
|---|---|---|
| 249,391 | 8/1962 | Australia. |

ALFRED L. BRODY, *Primary Examiner.*